United States Patent

(12) United States Patent
Yu et al.

(10) Patent No.: US 8,429,390 B2
(45) Date of Patent: Apr. 23, 2013

(54) METHOD FOR PERFORMING QUICK BOOT AND GENERAL BOOT AT BIOS STAGE

(75) Inventors: David Yu, Beitou District (TW);
Lawrence Chiu, Xinzhuang (TW);
Jeremy Wang, Minsheng East Road (TW); Sam Lo, Shilin District (TW);
Giant Liang, Fuxing Township (TW);
Susan Su, Zhongzheng District (TW)

(73) Assignee: Insyde Software Corp., Taipei (TW)

( * ) Notice: Subject to any disclaimer, the term of this patent is extended or adjusted under 35 U.S.C. 154(b) by 572 days.

(21) Appl. No.: 12/654,618

(22) Filed: Dec. 24, 2009

(65) Prior Publication Data

US 2011/0161646 A1 Jun. 30, 2011

(51) Int. Cl.
*G06F 15/177* (2006.01)
(52) U.S. Cl.
USPC ............... 713/2; 713/1; 710/8; 714/3; 714/36
(58) Field of Classification Search .................. 713/1, 2;
710/8; 714/3, 36
See application file for complete search history.

(56) References Cited

U.S. PATENT DOCUMENTS 7,814,307 B2 * 10/2010 Powell et al. ............... 713/2
7,890,741 B2 * 2/2011 Du et al. ..................... 713/1
2006/0149956 A1 * 7/2006 Chang ........................ 713/1

* cited by examiner

*Primary Examiner* — Thuan Du
(74) *Attorney, Agent, or Firm* — Nixon & Vanderhye, P.C.

(57) ABSTRACT

A method for performing a quick boot and a general boot at a basic input output system (BIOS) stage is described. A computer is powered on. An embedded controller firmware or a BIOS determines whether a quick boot key is pressed. If the quick boot key is not pressed, a boot flag is changed from Quick Boot to General Boot. If the quick boot key is pressed, the BIOS determines whether the boot flag is set to Quick Boot. If it is determined that the boot flag is set to Quick Boot, an initialization of drivers preset by the quick boot is performed, and uninitialized drivers are initialized at a stage when an operating system is started. If it is determined that the boot flag is set to General Boot, an initialization of all drivers is performed.

9 Claims, 1 Drawing Sheet

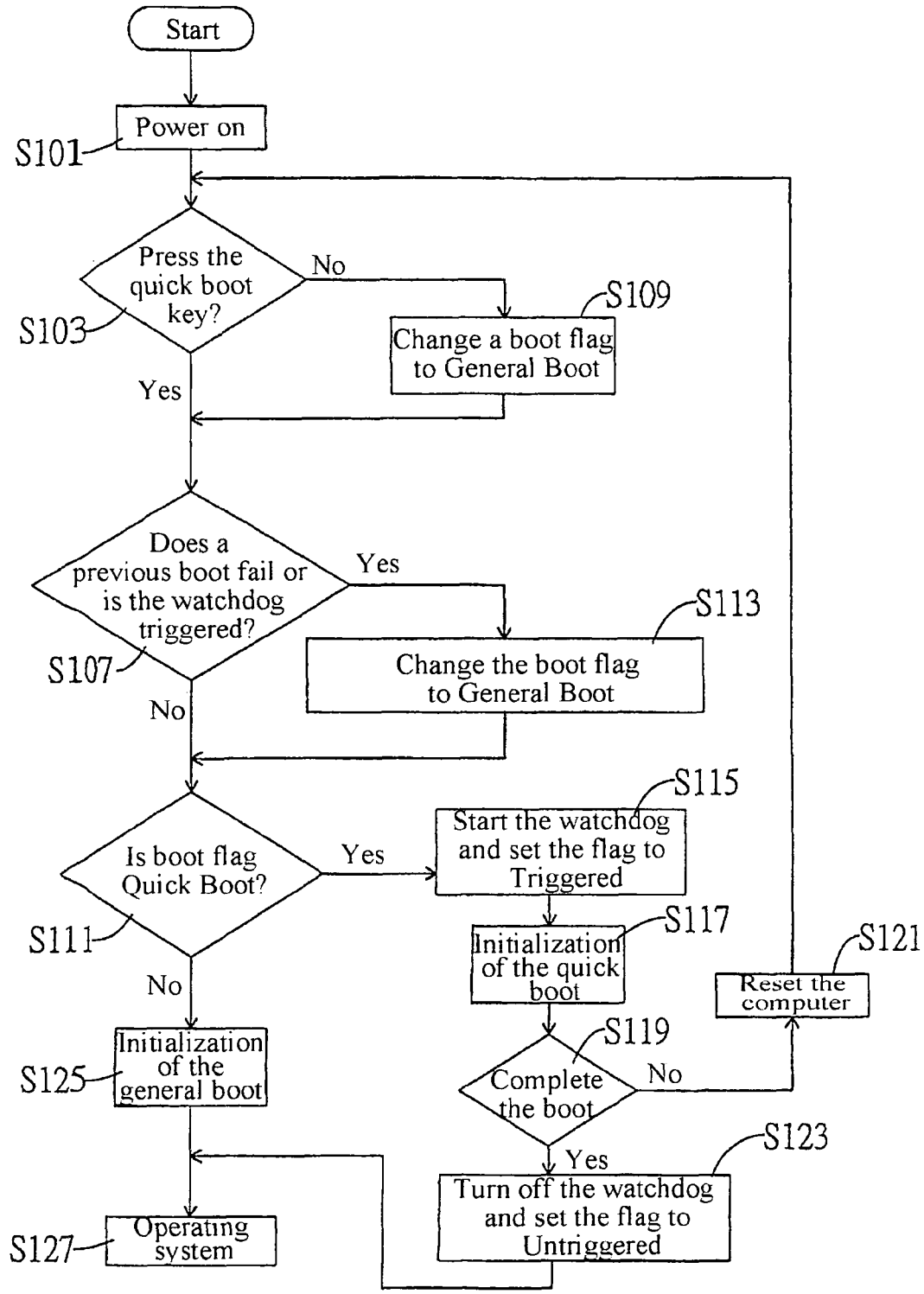

METHOD FOR PERFORMING QUICK BOOT AND GENERAL BOOT AT BIOS STAGE

BACKGROUND OF THE INVENTION

1. Field of Invention

The present invention relates to a method for performing a quick boot and a general boot when a computer is booted, and more particularly to a method for performing a quick boot and a general boot at a basic input output system (BIOS) stage.

2. Related Art

Operating a computer has become part of work for modern people, so that the functions and operating speed of the computer are continuously required to be improved. However, time spent at the computer boot stage is gradually increased, and the computer boot time is even increased from a few minutes to more than ten minutes. The lengthy boot time causes inconvenience for the user in using the computer. Therefore, how to shorten the computer boot time has been a topic studied by program developers.

Currently, a quick boot of a BIOS is generally performed in the following several manners.

1. A default value of a central processing unit (CPU) internal cache is set to Enable. This function is used to enable or disable a CPU Level 1 cache. The overall speed when the CPU Level 1 cache is enabled is raised much more than that when the CPU Level 1 cache is disabled.

2. A default value of an external cache is set to Enable. This function is used to enable or disable a CPU Level 2 cache. The overall speed when the CPU Level 2 cache is enabled is raised much more than that when the CPU Level 2 cache is disabled. The PentiumPro CPU already has a built-in CPU Level 2 cache.

3. A default value of a quick power on self test is set to Enable. When a computer is booted, the BIOS performs a series of power on self tests. When this function is enabled, the same test items will be simplified and skipped so as to shorten the boot time. For example, the memory test is skipped.

SUMMARY OF THE INVENTION

The present invention is directed to a method for performing a quick boot and a general boot at a BIOS stage, which completes a boot process at the BIOS stage at an increased speed to successfully enter an operating system without influencing an initialization of hardware devices in the boot process. The quick boot in the present invention can greatly reduce a BIOS boot time without sacrificing important functionalities and has optimized boot time performance, so as to ensure that every BIOS version meets strict boot time requirements.

In a first aspect, the present invention provides a method for performing a quick boot at a BIOS stage, which is applied in a computer including an embedded controller firmware and a BIOS. The method includes the following steps.

When the embedded controller firmware detects that a power key is pressed, the embedded controller firmware performs power on of the computer.

The BIOS performs an initialization of drivers preset by the quick boot, and uninitialized drivers are initialized at a stage when an operating system is started.

In a second aspect, the present invention provides a method for performing a quick boot and a general boot at a BIOS stage, which is applied in a computer including an embedded controller firmware and a BIOS. The method includes the following steps.

When the embedded controller firmware detects that a power key or a quick boot key is pressed, the embedded controller firmware performs power on of the computer.

The embedded controller firmware or the BIOS determines whether the quick boot key is pressed.

If the quick boot key is not pressed, the embedded controller firmware or the BIOS changes a boot flag from Quick Boot to General Boot.

If the quick boot key is pressed, the BIOS determines whether the boot flag is set to Quick Boot.

If the BIOS determines that the boot flag is set to Quick Boot, the BIOS performs an initialization of drivers preset by the quick boot, and uninitialized drivers are initialized at a stage when an operating system is started.

If the BIOS determines that the boot flag is set to General Boot, the BIOS performs an initialization of all drivers.

In a third aspect, the present invention provides a method for performing a quick boot and a general boot at a BIOS stage, which is applied in a computer including an embedded controller firmware and a BIOS. The method includes the following steps.

When the embedded controller firmware detects that a power key is pressed, the embedded controller firmware performs power on of the computer.

The embedded controller firmware or the BIOS determines whether a previous boot status flag is set to Fail.

If the embedded controller firmware or the BIOS determines that the previous boot status flag is set to Fail, the embedded controller firmware or the BIOS changes a boot flag from Quick Boot to General Boot.

If the embedded controller firmware or the BIOS determines that the previous boot status flag is set to Success, the BIOS determines whether the boot flag is set to Quick Boot.

If the BIOS determines that the boot flag is set to Quick Boot, the BIOS performs an initialization of drivers preset by the quick boot, and uninitialized drivers are initialized at a stage when an operating system is started.

If, the BIOS determines that the boot flag is set to General Boot, the BIOS performs an initialization of all drivers.

In a fourth aspect, the present invention provides a method for performing a quick boot and a general boot at a BIOS stage, which is applied in a computer including an embedded controller firmware and a BIOS. The method includes the following steps.

When the embedded controller firmware detects that a power key or a quick boot key is pressed, the embedded controller firmware performs power on of the computer.

The embedded controller firmware or the BIOS determines whether the quick boot key is pressed.

If the quick boot key is not pressed, the embedded controller firmware or the BIOS changes a boot flag from Quick Boot to General Boot.

If the quick boot key is pressed, the embedded controller firmware or the BIOS determines whether a previous boot status flag is set to Fail.

If the embedded controller firmware or the BIOS determines that the previous boot status flag is set to Fail, the embedded controller firmware or the BIOS changes the boot flag from Quick Boot to General Boot.

If the embedded controller firmware or the BIOS determines that the previous boot status flag is set to Success, the BIOS determines whether the boot flag is set to Quick Boot.

If the BIOS determines that the boot flag is set to Quick Boot, the BIOS performs an initialization of drivers preset by the quick boot, and uninitialized drivers are initialized at a stage when an operating system is started.

If the BIOS determines that the boot flag is set to General Boot, the BIOS performs an initialization of all drivers.

In a fifth aspect, the present invention provides a method for performing a quick boot and a general boot at a BIOS stage, which is applied in a computer including an embedded controller firmware, a BIOS, and a watchdog. The method includes the following steps.

When the embedded controller firmware detects that a power key is pressed, the embedded controller firmware performs power on of the computer.

The embedded controller firmware or the BIOS determines whether a watchdog flag is set to a Triggered state.

If the embedded controller firmware or the BIOS determines that the watchdog flag is set to the Triggered state, the embedded controller firmware or the BIOS changes a boot flag from Quick Boot to General Boot.

If the embedded controller firmware or the BIOS determines that the watchdog flag is set to an Untriggered state, the BIOS determines whether the boot flag is set to Quick Boot.

If the BIOS determines that the boot flag is set to Quick Boot, the BIOS starts the watchdog and sets the watchdog flag to the Triggered state.

In a timing period preset by the watchdog, the BIOS performs an initialization of drivers preset by the quick boot, and uninitialized drivers are initialized at a stage when an operating system is started.

Before the timing of the watchdog ends, it is determined whether the BIOS completes the initialization of the quick boot.

If the BIOS does not complete the initialization of the quick boot, the watchdog sends a trigger signal to reset the computer, and then the step of determining by the embedded controller firmware or the BIOS whether the watchdog flag is set to the Triggered state is performed.

If the BIOS completes the initialization of the quick boot, the BIOS turns off the watchdog and sets the watchdog flag to the Untriggered state.

If the BIOS determines that the boot flag is set to General Boot, the BIOS performs an initialization of all drivers.

In a sixth aspect, the present invention provides a method for performing a quick boot and a general boot at a BIOS stage, which is applied in a computer including an embedded controller firmware, a BIOS, and a watchdog. The method includes the following steps.

When the embedded controller firmware detects that a power key is pressed, the embedded controller firmware performs power on of the computer.

The embedded controller firmware or the BIOS determines whether a previous boot status flag is set to Fail or whether a watchdog flag is set to a Triggered state.

If the embedded controller firmware or the BIOS determines that the previous boot status flag is set to Fail or that the watchdog flag is set to the Triggered state, the embedded controller firmware or the BIOS changes a boot flag from Quick Boot to General Boot.

If the embedded controller firmware or the BIOS determines that the previous boot status flag is set to Success and that the watchdog flag is set to an Untriggered state, the BIOS determines whether the boot flag is set to Quick Boot.

If the BIOS determines that the boot flag is set to Quick Boot, the BIOS starts the watchdog and sets the watchdog flag to the Triggered state.

In a timing period preset by the watchdog, the BIOS performs an initialization of drivers preset by the quick boot, and uninitialized drivers are initialized at a stage when an operating system is started.

Before the timing of the watchdog ends, it is determined whether the BIOS completes the initialization of the quick boot.

If the BIOS does not complete the initialization of the quick boot, the watchdog sends a trigger signal to reset the computer, and then the step of determining by the embedded controller firmware or the BIOS whether the previous boot status flag is set to Fail or whether the watchdog flag is set to the Triggered state is performed.

If the BIOS completes the initialization of the quick boot, the BIOS turns off the watchdog and sets the watchdog flag to the Untriggered state.

If the BIOS determines that the boot flag is set to General Boot, the BIOS performs an initialization of all drivers.

In a seventh aspect, the present invention provides a method for performing a quick boot and a general boot at a BIOS stage, which is applied in a computer including an embedded controller firmware, a BIOS, and a watchdog. The method includes the following steps.

When the embedded controller firmware detects that a power key or a quick boot key is pressed, the embedded controller firmware performs power on of the computer.

The embedded controller firmware or the BIOS determines whether the quick boot key is pressed.

If the quick boot key is not pressed, the embedded controller firmware or the BIOS changes a boot flag from Quick Boot to General Boot.

If the quick boot key is pressed, the embedded controller firmware or the BIOS determines whether a watchdog flag is set to a Triggered state.

If the embedded controller firmware or the BIOS determines that the watchdog flag is set to the Triggered state, the embedded controller firmware or the BIOS changes the boot flag from Quick Boot to General Boot.

If the embedded controller firmware or the BIOS determines that the watchdog flag is set to an Untriggered state, the BIOS determines whether the boot flag is set to Quick Boot.

If the BIOS determines that the boot flag is set to Quick Boot, the BIOS starts the watchdog and sets the watchdog flag to the Triggered state.

In a timing period preset by the watchdog, the BIOS performs an initialization of drivers preset by the quick boot, and uninitialized drivers are initialized at a stage when an operating system is started.

Before the timing of the watchdog ends, it is determined whether the BIOS completes the initialization of the quick boot.

If the BIOS does not complete the initialization of the quick boot, the watchdog sends a trigger signal to reset the computer, and then the step of determining by the embedded controller firmware or the BIOS whether the quick boot key is pressed is performed.

If the BIOS completes the initialization of the quick boot, the BIOS turns off the watchdog and sets the watchdog flag to the Untriggered state.

If the BIOS determines that the boot flag is set to General Boot, the BIOS performs an initialization of all drivers.

In an eighth aspect, the present invention provides a method for performing a quick boot and a general boot at a BIOS stage, which is applied in a computer including an embedded controller firmware, a BIOS, and a watchdog. The method includes the following steps.

When the embedded controller firmware detects that a power key or a quick boot key is pressed, the embedded controller firmware performs power on of the computer.

The embedded controller firmware or the BIOS determines whether the quick boot key is pressed.

If the quick boot key is not pressed, the embedded controller firmware or the BIOS changes a boot flag from Quick Boot to General Boot.

If the quick boot key is pressed, the embedded controller firmware or the BIOS determines whether a previous boot status flag is set to Fail or whether a watchdog flag is set to a Triggered state.

If the embedded controller firmware or the BIOS determines that the previous boot status flag is set to Fail or that the watchdog flag is set to the Triggered state, the embedded controller firmware or the BIOS changes the boot flag from Quick Boot to General Boot.

If the embedded controller firmware or the BIOS determines that the previous boot status flag is set to Success and that the watchdog flag is set to an Untriggered state, the BIOS determines whether the boot flag is set to Quick Boot.

If the BIOS determines that the boot flag is set to Quick Boot, the BIOS starts the watchdog and sets the watchdog flag to the Triggered state.

In a timing period preset by the watchdog, the BIOS performs an initialization of drivers preset by the quick boot, and uninitialized drivers are initialized at a stage when an operating system is started.

Before the timing of the watchdog ends, it is determined whether the BIOS completes the initialization of the quick boot.

If the BIOS does not complete the initialization of the quick boot, the watchdog sends a trigger signal to reset the computer, and then the step of determining by the embedded controller firmware or the BIOS whether the quick boot key is pressed is performed.

If the BIOS completes the initialization of the quick boot, the BIOS turns off the watchdog and sets the watchdog flag to the Untriggered state.

If the BIOS determines that the boot flag is set to General Boot, the BIOS performs an initialization of all drivers.

In a ninth aspect, the present invention provides a computer readable recording medium having a program stored, in which the methods according to the first to eighth embodiments may be realized after a computer loads the program from the computer readable recording medium and executes the program.

In a tenth aspect, the present invention provides a computer program product having a program stored, in which the methods according to the first to eighth embodiments may be realized after a computer loads the computer program from the computer program product and executes the computer program.

BRIEF DESCRIPTION OF THE DRAWINGS

The present invention will become more fully understood from the detailed description given herein below for illustration only, and thus are not limitative of the present invention, and wherein:

FIG. 1 is a flow chart of a method for performing a quick boot and a general boot at a BIOS stage according to the present invention.

DETAILED DESCRIPTION OF THE INVENTION

A preferred embodiment of the present invention is illustrated below with reference to the accompanying drawing.

FIG. 1 is a flow chart of a method for performing a quick boot and a general boot at a BIOS stage according to the present invention. The process steps in FIG. 1 are implemented in combination with firmware and hardware architectures of a computer. The firmware and hardware architectures of the computer described below are well known to those of ordinary skill in the art, and the illustration thereof are omitted herein.

In FIG. 1, a so-called BIOS is applicable to a conventional BIOS, a unified extensible firmware interface/extensible firmware interface basic input output system (UEFI/EFI BIOS), or the like.

In FIG. 1, the method for performing a quick boot and a general boot at a BIOS stage according to the present invention is applied in a computer which includes an embedded controller firmware, a BIOS, and a watchdog.

First, when the embedded controller firmware detects that a user presses a power key or a quick boot key of the computer, the embedded controller firmware performs power on of the computer (Step S101).

Then, the embedded controller firmware or the BIOS determines whether the user presses the quick boot key to turn a BIOS boot into a quick boot procedure (Step S103). Only when the embedded controller firmware performs an initialization of hardware related to power management and then trips to a start position of the BIOS to start the BIOS, the BIOS can determine whether the user presses the quick boot key and perform the following steps of setting flags. The procedure of a BIOS power on self test is well known to those skilled in the art, and will not be described herein additionally.

If the user presses the quick boot key, the embedded controller firmware or the BIOS determines whether a previous boot status flag, is set to Fail or whether a watchdog flag is set to a Triggered state (Step S107). The previous boot status flag is set to Fail in the case that, for example, a start of an operating system fails or a general boot or quick boot procedure of the BIOS fails. If the user does not press the quick boot key, the embedded controller firmware or the BIOS changes a boot flag from Quick Boot to General Boot (Step S109), and then Step S107 is performed. Similarly, only when the embedded controller firmware performs the initialization of hardware related to power management and then trips to the start position of the BIOS to start the BIOS, the BIOS can determine whether the previous boot status flag is set to Fail or whether the watchdog flag is set to the Triggered state and perform the following steps of setting the flags.

If the embedded controller firmware or the BIOS determines that the previous boot status flag is set to Success and that the watchdog flag is set to an Untriggered state, the BIOS determines whether the boot flag is set to Quick Boot (Step S111). If the embedded controller firmware or the BIOS determines that the previous boot status flag is set to Fail or that the watchdog flag is set to the Triggered state, the embedded controller firmware or the BIOS changes the boot flag from Quick Boot to General Boot (Step S113), and then Step S111 is performed.

If the BIOS determines that the boot flag is set to Quick Boot, the BIOS starts the watchdog and sets the watchdog flag to the Triggered state (Step S115).

Then, in a timing period preset by the watchdog, the BIOS performs an initialization of drivers preset by the quick boot, and the remaining uninitialized drivers are initialized at a stage when an operating system is started (Step S117). The drivers initialized at the stage when the operating system is started are drivers related to a mouse, a keyboard, a screen, and the like.

Afterwards, before the timing of the watchdog ends, it is determined whether the BIOS completes the initialization of the drivers of the quick boot (Step S119). If the BIOS does not complete the initialization of the drivers of the quick boot, the watchdog sends a trigger signal to reset the computer (Step S121), and then Step S103 is performed. A method for resetting the computer by the watchdog is the conventional art in the technical field of the present invention. If the BIOS completes the initialization of the drivers of the quick boot, the BIOS turns off the watchdog and sets the watchdog flag to the Untriggered state (Step S123).

Then, if the BIOS determines that the boot flag is set to General Boot, the BIOS performs an initialization of all drivers (Step S125). After the BIOS performs the initialization of all drivers, if the watchdog flag is set to the Triggered state, the BIOS changes the watchdog flag to the Untriggered state.

After the BIOS performs the initialization of the drivers of the general boot or the quick boot, the computer performs the start of the operating system (Step S127). At the end of the execution of the operating system, the operating system changes the previous boot status flag to Success if the previous boot status flag is set to Fail.

The above embodiment illustrates an implementation aspect of the present invention, but is not intended to limit the scope of the present invention. Different variations can be made to the above embodiment to serve as different implementation aspects of the present invention, which are described below.

A first variation aspect of the present invention implements Steps S101, S117, and S127 in FIG. 1, so as to achieve a method for performing a quick boot at a BIOS stage. The steps are implemented as described above, and will not be described herein.

A second variation aspect of the present invention implements Steps S101, S103, S109, S111, S117, S125, and S127 in FIG. 1, so as to achieve a method for performing a quick boot and a general boot at a BIOS stage. The steps are implemented as described above, and will not be described herein.

A third variation aspect of the present invention implements Steps S101, the step of determining by the BIOS whether a previous boot status flag is set to Fail in S107, S111, S113, S117, S125, and S127 in FIG. 1, so as to achieve a method for performing a quick boot and a general boot at a BIOS stage. The steps are implemented as described above, and will not be described herein.

A fourth variation aspect of the present invention implements Steps S101, the step of determining by the BIOS whether a watchdog flag is set to a Triggered state in S107, S111, S113, S115, S117, S119, S121, S123, S125, and S127 in FIG. 1, so as to achieve a method for performing a quick boot and a general boot at a BIOS stage. The steps are implemented as described above, and will not be described herein.

A fifth variation aspect of the present invention implements Steps S101, S105, S109, S111, S113, S115, S117, S119, S121, S123, S125, and S127 in FIG. 1, so as to achieve a method for performing a quick boot and a general boot at a BIOS stage. The steps are implemented as described above, and will not be described herein.

A sixth variation aspect of the present invention implements Steps S101, S103, the step of determining by the BIOS a the previous boot status flag is set to Fail in S107, S109, S111, S113, S117, S125, and S127 in FIG. 1, so as to achieve a method for performing a quick boot and a general boot at a BIOS stage. The steps are implemented as described above, and will not be described herein.

A seventh variation aspect of the present invention implements Steps S101, S103, the step of determining by the BIOS whether a watchdog flag is set to a Triggered state in S107, S109, S111, S113, S115, S117, S119, S121, S123, S125, and S127 in FIG. 1, so as to achieve a method for performing a quick boot and a general boot at a BIOS stage. The steps are implemented as described above, and will not be described herein.

The above method for performing a quick boot and a general boot at a BIOS stage in the present invention may be written in the form of a program, and the program may be stored in a computer readable recording medium. The method steps shown in the above description and drawing can be realized after a computer loads the program from the computer readable recording medium and executes the program.

Similarly, the above method for performing a quick boot and a general boot at a BIOS stage in the present invention may be realized by a computer program product. The method steps shown in the above description and drawing can be realized after a computer downloads the computer program product from, for example, a network, and executes the computer program.

The present invention has the advantage of providing a method for performing a quick boot and a general boot at a BIOS stage, which completes a boot process at the BIOS stage at an increased speed to successfully enter an operating system without influencing an initialization of hardware devices in the boot process. Moreover, the quick boot in the present invention can greatly reduce a BIOS boot time without sacrificing important functionalities and has optimized boot time performance, so as to ensure that every BIOS version meets strict boot time requirements.

Although the present invention has been described above with reference to the preferred embodiment and illustrative accompanying drawing, it is not intended to be limitative. Various modifications, omissions, and variations made by those skilled in the art to the form and the content of the embodiment of the invention shall fall within the scope of the present invention.

What is claimed is:

1. A method for performing a quick boot and a general boot at a basic input output system (BIOS) stage, applied in a computer comprising an embedded controller firmware and a BIOS, the method comprising:

when the embedded controller firmware detects that a power key is pressed, the embedded controller firmware performing power on of the computer;

the embedded controller firmware or the BIOS determining whether a previous boot status flag is set to Fail;

if the embedded controller firmware or the BIOS determines that the previous boot status flag is set to Fail, the embedded controller firmware or the BIOS changing a boot flag from Quick Boot to General Boot;

if the embedded controller firmware or the BIOS determines that the previous boot status flag is set to Success, the BIOS determining whether the boot flag is set to Quick Boot;

if the BIOS determines that the boot flag is set to Quick Boot, the BIOS performing an initialization of drivers preset by the quick boot, and uninitialized drivers being initialized at a stage when an operating system is started; and if the BIOS determines that the boot flag is set to General Boot, the BIOS performing an initialization of all drivers.

2. The method according to claim 1, wherein the drivers initialized at the stage when the operating system is started are the drivers related to a mouse, a keyboard, and a screen.

3. A non-transitory computer readable storage medium having a computer program stored thereon, wherein after a computer loads the program from the computer readable recording medium, the computer executes the method steps according to claim 2.

4. A computer program product comprising a non-transitory computer readable storage medium having a program stored, wherein when executed by a computer, the program executes the steps of the method according to claim 2.

5. A method for performing a quick boot and a general boot at a basic input output system (BIOS) stage, applied in a computer comprising an embedded controller firmware and a BIOS, the method comprising:

when the embedded controller firmware detects that a power key or a quick boot key is pressed, the embedded controller firmware performing power on of the computer;

the embedded controller firmware or the BIOS determining whether the quick boot key is pressed;

if the quick boot key is not pressed, the embedded controller firmware or the BIOS changing a boot flag from Quick Boot to General Boot;

if the quick boot key is pressed, the embedded controller firmware or the BIOS determining whether a previous boot status flag is set to Fail;

if the embedded controller firmware or the BIOS determines that the previous boot status flag is set to Fail, the embedded controller firmware or the BIOS changing the boot flag from Quick Boot to General Boot;

if the embedded controller firmware or the BIOS determines that the previous boot status flag is set to Success, the BIOS determining whether the boot flag is set to Quick Boot;

if the BIOS determines that the boot flag is set to Quick Boot, the BIOS performing an initialization of drivers preset by the quick boot, and uninitialized drivers being initialized at a stage when an operating system is started; and if the BIOS determines that the boot flag is set to General Boot, the BIOS performing an initialization of all drivers.

6. A method for performing a quick boot and a general boot at a basic input output system (BIOS) stage, applied in a computer comprising an embedded controller firmware, a BIOS, and a watchdog, the method comprising:

when the embedded controller firmware detects that a power key is pressed, the embedded controller firmware performing power on of the computer;

the embedded controller firmware or the BIOS determining whether a watchdog flag is set to a Triggered state;

if the embedded controller firmware or the BIOS determines that the watchdog flag is set to the Triggered state, the embedded controller firmware or the BIOS changing a boot flag from Quick Boot to General Boot;

if the embedded controller firmware or the BIOS determines that the watchdog flag is set to an Untriggered state, the BIOS determining whether the boot flag is set to Quick Boot;

if the BIOS determines that the boot flag is set to Quick Boot, the BIOS starting the watchdog and setting the watchdog flag to the Triggered state;

in a timing period preset by the watchdog, the BIOS performing an initialization of drivers preset by the quick boot, and uninitialized drivers being initialized at a stage when an operating system is started;

before the timing of the watchdog ends, determining whether the BIOS completes the initialization of the quick boot;

if the BIOS does not complete the initialization of the quick boot, the watchdog sending a trigger signal to reset the computer, and then performing the step of determining by the embedded controller firmware or the BIOS whether the watchdog flag is set to the Triggered state;

if the BIOS completes the initialization of the quick boot, the BIOS turning off the watchdog and setting the watchdog flag to the Untriggered state; and if the BIOS determines that the boot flag is set to General Boot, the BIOS performing an initialization of all drivers.

7. A method for performing a quick boot and a general boot at a basic input output system (BIOS) stage, applied in a computer comprising an embedded controller firmware, a BIOS, and a watchdog, the method comprising:

when the embedded controller firmware detects that a power key is pressed, the embedded controller firmware performing power on of the computer;

the embedded controller firmware or the BIOS determining whether a previous boot status flag is set to Fail or whether a watchdog flag is set to a Triggered state;

if the embedded controller firmware or the BIOS determines that the previous boot status flag is set to Fail or that the watchdog flag is set to the Triggered state, the embedded controller firmware or the BIOS changing a boot flag from Quick Boot to General Boot;

if the embedded controller firmware or the BIOS determines that the previous boot status flag is set to Success and that the watchdog flag is set to an Untriggered state, the BIOS determining whether the boot flag is set to Quick Boot;

if the BIOS determines that the boot flag is set to Quick Boot, the BIOS starting the watchdog and setting the watchdog flag to the Triggered state;

in a timing period preset by the watchdog, the BIOS performing an initialization of drivers preset by the quick boot, and uninitialized drivers being initialized at a stage when an operating system is started;

before the timing of the watchdog ends, determining whether the BIOS completes the initialization of the quick boot;

if the BIOS does not complete the initialization of the quick boot, the watchdog sending a trigger signal to reset the computer, and then performing the step of determining by the embedded controller firmware or the BIOS whether the previous boot status flag is set to Fail or whether the watchdog flag is set to the Triggered state;

if the BIOS completes the initialization of the quick boot, the BIOS turning off the watchdog and setting the watchdog flag to the Untriggered state; and if the BIOS determines that the boot flag is set to General Boot, the BIOS performing an initialization of all drivers.

8. A method for performing a quick boot and a general boot at a basic input output system (BIOS) stage, applied in a computer comprising an embedded controller firmware, a BIOS, and a watchdog, the method comprising:

when the embedded controller firmware detects that a power key or a quick boot key is pressed, the embedded controller firmware performing power on of the computer;

the embedded controller firmware or the BIOS determining whether the quick boot key is pressed;

if the quick boot key is not pressed, the embedded controller firmware or the BIOS changing a boot flag from Quick Boot to General Boot;

if the quick boot key is pressed, the embedded controller firmware or the BIOS determining whether a watchdog flag is set to a Triggered state;

if the embedded controller firmware or the BIOS determines that the watchdog flag is set to the Triggered state, the embedded controller firmware or the BIOS changing the boot flag from Quick Boot to General Boot;

if the embedded controller firmware or the BIOS determines that the watchdog flag is set to an Untriggered state, the BIOS determining whether the boot flag is set to Quick Boot;

if the BIOS determines that the boot flag is set to Quick Boot, the BIOS starting the watchdog and setting the watchdog flag to the Triggered state;

in a timing period preset by the watchdog, the BIOS performing an initialization of drivers preset by the quick boot, and uninitialized drivers being initialized at a stage when an operating system is started;

before the timing of the watchdog ends, determining whether the BIOS completes the initialization of the quick boot;

if the BIOS does not complete the initialization of the quick boot, the watchdog sending a trigger signal to reset the computer, and then performing the step of determining by the embedded controller firmware or the BIOS whether the quick boot key is pressed;

if the BIOS completes the initialization of the quick boot, the BIOS turning off the watchdog and setting the watchdog flag to the Untriggered state; and if the BIOS determines that the boot flag is set to General Boot, the BIOS performing an initialization of all drivers.

9. A method for performing a quick boot and a general boot at a basic input output system (BIOS) stage, applied in a computer comprising an embedded controller firmware, a BIOS, and a watchdog, the method comprising:

when the embedded controller firmware detects that a power key or a quick boot key is pressed, the embedded controller firmware performing power on of the computer;

the embedded controller firmware or the BIOS determining whether the quick boot key is pressed;

if the quick boot key is not pressed, the embedded controller firmware or the BIOS changing a boot flag from Quick Boot to General Boot;

if the quick boot key is pressed, the embedded controller firmware or the BIOS determining whether a previous boot status flag is set to Fail or whether a watchdog flag is set to a Triggered state;

if the embedded controller firmware or the BIOS determines that the previous boot status flag is set to Fail or that the watchdog flag is set to the Triggered state, the embedded controller firmware or the BIOS changing the boot flag from Quick Boot to General Boot;

if the BIOS determines that the previous boot status flag is set to Success and that the watchdog flag is set to an Untriggered state, the BIOS determining whether the boot flag is set to Quick Boot;

if the BIOS determines that the boot flag is set to Quick Boot, the BIOS starting the watchdog and setting the watchdog flag to the Triggered state;

in a timing period preset by the watchdog, the BIOS performing an initialization of drivers preset by the quick boot, and uninitialized drivers being initialized at a stage when an operating system is started;

before the timing of the watchdog ends, determining whether the BIOS completes the initialization of the quick boot;

if the BIOS does not complete the initialization of the quick boot, the watchdog sending a trigger signal to reset the computer, and then performing the step of determining by the embedded controller firmware or the BIOS whether the quick boot key is pressed;

if the BIOS completes the initialization of the quick boot, the BIOS turning off the watchdog and setting the watchdog flag to the Untriggered state; and if the BIOS determines that the boot flag is set to General Boot, the BIOS performing an initialization of all drivers.

* * * * *